United States Patent

Urabe et al.

[11] Patent Number: 5,828,707
[45] Date of Patent: Oct. 27, 1998

[54] DIFFERENTIAL DETECTING APPARATUS FOR DETECTING PHASE DIFFERENCE OF PHASE-MODULATED SIGNAL

[75] Inventors: Yoshio Urabe, Ibaraki; Hitoshi Takai, Osaka-fu; Hidetoshi Yamasaki, Amagasaki, all of Japan

[73] Assignee: Matsushita Electric Ind., Co., Ltd., Osaka-fu, Japan

[21] Appl. No.: 731,830

[22] Filed: Oct. 21, 1996

[30] Foreign Application Priority Data

Oct. 24, 1995 [JP] Japan .................................. 7-275340

[51] Int. Cl.$^6$ .............................. H03D 3/22; H04L 27/22
[52] U.S. Cl. ........................ 375/330; 375/324; 329/304
[58] Field of Search .................................. 375/330, 331, 375/340, 324, 332; 329/304, 306

[56] References Cited

U.S. PATENT DOCUMENTS 4,849,706  7/1989  Davis et al. ............................ 375/331
5,007,068  4/1991  Simon et al. ............................ 375/331
5,017,883  5/1991  Divsalar et al. ........................ 375/331
5,379,323  1/1995  Nakaya .................................. 375/331

*Primary Examiner*—Temesghen Ghebretinsae
*Attorney, Agent, or Firm*—Price, Gess & Ubell

[57] ABSTRACT

A differential detecting apparatus includes samplers 1 and 2, differential detection calculating unit 3, and two post-detection filters 4 and 5. Differential detection calculating unit 3 performs a differential detection with time-division multiplexing on data output from these samplers and alternately outputs a data sequence of a part of cosine component of the phase difference of the modulated signal and a data sequence of the rest of the cosine component. Differential detection calculating unit 3 also alternately outputs a data sequence of a part of sine component of the phase difference and a data sequence of the rest of the sine component. Each of post-detection filters 4 and 5 includes linear interpolating filter 35 and integral filter 36 which are connected in series. The linear interpolating filter 35 obtains a moving average from successive three pieces of input data weighted by 1:2:1 and the integral filter 36 obtains an integral value from successive k pieces of input data.

17 Claims, 11 Drawing Sheets

Fig. 4

| nT | I(nT) | Q(nT) | S₁(nT) | S₁{I(n−m)T} | S₂(nT) | F₁(nT) | F₂(nT) |
|---|---|---|---|---|---|---|---|
| .. | .. | .. | .. | .. | .. | .. | .. |
| T | I(T) | Q(T) | I(T) | I(−3T) | Q(T) | I(T)*I(−3T) | I(−3T)*Q(T) |
| 2T | I(2T) | Q(2T) | Q(2T) | Q(−2T) | −I(2T) | Q(2T)*Q(−2T) | −I(2T)*Q(−2T) |
| 3T | I(3T) | Q(3T) | I(3T) | I(−T) | Q(3T) | I(3T)*I(−T) | I(−T)*Q(3T) |
| 4T | I(4T) | Q(4T) | Q(4T) | Q(0) | −I(4T) | Q(4T)*Q(0) | −I(4T)*Q(0) |
| .. | .. | .. | .. | .. | .. | .. | .. |

Fig. 5

| nT | PRESENT EMBODIMENT F1(nT)<br>CONVENTIONAL E1(nT) | PRESENT EMBODIMENT F2(nT)<br>CONVENTIONAL E2(nT) |
|---|---|---|
| T | I(T)*I(−3T) | I(−3T)*Q(T) |
|   | NO OUTPUT | NO OUTPUT |
| 2T | Q(2T)*Q(−2T) | −I(2T)*Q(−2T) |
|    | I(2T)*I(−2T)+Q(2T)*Q(−2T) | I(−2T)*Q(2T)−I(2T)*Q(−2T) |
| 3T | I(3T)*I(−T) | I(−T)*Q(3T) |
|    | NO OUTPUT | NO OUTPUT |
| 4T | Q(4T)*Q(0) | −I(4T)*Q(0) |
|    | I(4T)*I(0)+Q(4T)*Q(0) | I(0)*Q(4T)−I(4T)*Q(0) |
| 5T | I(5T)*I(T) | I(T)*Q(5T) |
|    | NO OUTPUT | NO OUTPUT |
| 6T | Q(6T)*Q(2T) | −I(6T)*Q(2T) |
|    | I(6T)*I(2T)+Q(6T)*Q(2T) | I(2T)*Q(6T)−I(6T)*Q(2T) |
| 7T | I(7T)*I(−3T) | I(3T)*Q(7T) |
|    | NO OUTPUT | NO OUTPUT |
| 8T | Q(8T)*Q(4T) | −I(8T)*Q(4T) |
|    | I(8T)*I(4T)+Q(8T)*Q(4T) | I(4T)*Q(8T)−I(8T)*Q(4T) |

DIFFERENTIAL DETECTING APPARATUS FOR DETECTING PHASE DIFFERENCE OF PHASE-MODULATED SIGNAL

BACKGROUND OF THE INVENTION (1) Field of the Invention

This invention relates to a differential detecting apparatus for demodulating phase-modulated signals by digital signal processing.

(2) Description of the Prior Art

The differential detection, a method for demodulating phase-modulated signals, has been widely used for digital transmissions like mobile communications. This is because the differential detection, detecting a phase difference between a time slot for a current "symbol" and a time slot for the preceding "symbol," is less affected by a phenomenon called fading which is a disturbance unique to mobile communications, where the symbol represents a unit information modulated and transmitted by a transmitter.

Conventionally, a standard differential detection method had taken a form in which an intermediate-frequency signal value is multiplied by a value of a signal delayed by certain symbols. Recently, a baseband differential detecting apparatus has been developed with the spread of digital signal processing. Such an apparatus is disclosed in Japanese Laid-Open Patent Application No. 63-153942 and Japanese Laid-Open Utility Model No. 2-70542. The baseband differential detecting apparatus is more suitable for digital signal processing than conventional methods which directly calculate intermediate-frequency signals since the baseband differential detecting apparatus handles with low-frequency signals. Now, a conventional baseband differential detecting apparatus is described with reference to the drawings.

FIG. 1 shows the structure of the conventional baseband differential detecting apparatus.

In the figure, i(t) and q(t) respectively represent inphase and quadrature-phase components of baseband signals obtained by performing a quasi-synchronous quadrature detection on modulated signals. That is, inphase component i(t) is an analog signal obtained by multiplying a received modulated signal with a carrier wave from a local transmitter being set for a center frequency of the modulated signal; and quadrature-phase component q(t) an analog signal obtained by multiplying a received modulated signal with a carrier wave whose phase is shifted by $\pi/2$ radian from the above carrier wave.

21 and 22 are samplers for sampling baseband signals i(t) and q(t) at intervals of time T. Differential detection calculating unit 33 includes delays 23 and 24, multipliers 25, 26, 27, and 28, adder 29, and subtracter 30. 31 and 32 are post-detection filters.

Now, the operation of the conventional differential detecting apparatus constructed as above is described.

Sampler 21 samples inphase component i(t) of a baseband signal at time t (t=nT, where n is an integer, that is, n= . . . −1, 0, 1, 2, . . . ) and generates inphase data I(nT) of the baseband signal, being a sampling baseband signal.

Inphase data I(nT) is input to delay 23 and multiplier 25. This inphase data I(nT) is delayed one symbol time mT by delay 23 and output as delayed inphase data I{(n−m)T}. Then, the data enters multiplier 25, where m is a natural number representing the number of samples in one symbol time.

Similarly, quadrature-phase component q(nT) is processed by sampler 22 and delay 24 and converted respectively to quadrature-phase data Q(nT) and delayed quadrature-phase data Q{(n−m)T}.

As shown above, a plurality pieces of data, namely I(nT) and Q(nT), are obtained in one symbol time. With such an arrangement, samplers 21 and 22 need not perform sampling by synchronizing with a symbol included in the modulated signal. This arrangement also provides stable demodulations.

Multiplier 25 multiplies inphase data I(nT) by delayed inphase data I{(n−m)T}, and multiplier 26 multiplies quadrature-phase data Q(nT) by delayed quadrature-phase data Q{(n−m)T}. Then, adder 29 performs an addition with the multiplication results and outputs detection data E1(nT) which is represented by the following formula:

Formula 1

$$E1(nT)=I(nT)*I\{(n-m)T\}+Q(nT)*Q\{(n-m)T\}.$$

Similarly, multiplier 27 multiplies quadrature-phase data Q(nT) by delayed inphase data I{(n−m)T}, multiplier 28 inphase data I(nT) by delayed quadrature-phase data Q{(n−m)T}. Then, subtracter 30 performs a subtraction with the multiplication results and outputs detection data E2(nT) which is represented by the following formula:

Formula 2

$$E2(nT)=Q(nT)*I\{(n-m)T\}+I(nT)*Q\{(n-m)T\}.$$

Note that detection data pieces E1(nT) and E2(nT) are respectively equal to a cosine component and a sine component of a phase difference between two adjacent symbols of a modulated signal. This is described with reference to formulae.

It is assumed that the phase of sampled baseband signal I(nT)+jQ(nT) is $\theta1$, and that the phase of sampled baseband signal I{(n−m)T}+jQ{(n−m)T} which is one symbol earlier than the above baseband signal is $\theta2$. The relation is represented by the following formula:

Formula 3

$I(nT)=\cos\theta1$ $Q(nT)=\sin\theta1$ $I\{(n-m)T\}=\cos\theta2$ $Q\{(n-m)T\}=\sin\theta2$.

Then, the cosine component and the sine component of phase difference ($\theta1-\theta2$) respectively coincide with detection data E1(nT) and E2(nT) from the following formulae:

Formula 4

$$\begin{aligned}\cos(\theta1-\theta2) &= \cos\theta1\cos\theta2 + \sin\theta1\sin\theta2 \\ &= I(nT)*I\{(n-m)T\} + Q(nT)*Q\{(n-m)T\} \\ &= E1(nT)\end{aligned}$$

Formula 5

$$\begin{aligned}\sin(\theta1-\theta2) &= \sin\theta1\cos\theta2 - \cos\theta1\sin\theta2 \\ &= Q(nT)*I\{(n-m)T\} - I(nT)*Q\{(n-m)T\} \\ &= E2(nT).\end{aligned}$$

The detection data pieces E1(nT) and E2(nT) obtained through vector operations performed by differential detection calculating unit 33 are respectively input to post-detection filters 31 and 32. These post-detection filters remove unnecessary high-frequency components generated by samplers 21 and 22 through sampling, and output demodulated baseband signals C1(nT) and C2(nT). As a result, the transmitted information being equal to the phase difference between two adjacent symbols is demodulated.

As shown above, the conventional differential detecting apparatus achieves the differential detection by digitizing phase-modulated signals and then performing vector operations of Formulae 4 and 5.

However, it is difficult to apply the conventional differential detecting apparatus to small communications equipments like mobile phones since the conventional differential detecting apparatus requires many hardware components.

More specifically, the conventional differential detecting apparatus requires two delays (23, 24), four multipliers (25, 26, 27, 28), an adder (29), and a subtracter (30) for performing vector operations. Therefore, achieving these hardware components in an IC (Integrated Circuit) in a chip is difficult since too many gate devices are required.

SUMMARY OF THE INVENTION

It is therefore the first object of the present invention to provide a differential detecting apparatus achieved in a small-scale circuit which can be easily achieved in an IC. More specifically, to provide a differential detection calculating unit for performing the vector operations with a small-scale circuit.

It is the second object of the present invention to provide a post-detection filter which has a function to remove high-frequency waves and is achieved in a small-scale circuit.

The above objects are achieved by a differential detecting apparatus including first and second samplers, a differential detection calculating unit, and first and second post-detection filters.

The differential detection calculating unit includes a cosine component calculating unit and a sine component calculating unit.

The cosine component calculating unit includes a selector, a delay, and a multiplier. The cosine component calculating unit alternately calculates and outputs, as first detection data, inphase data multiplied by another inphase data which is certain symbol times earlier than the inphase data, both pieces of inphase data being output from the first sampler, and quadrature-phase data multiplied by another quadrature-phase data which is certain symbol times earlier than the quadrature-phase data, both pieces of quadrature-phase data being output from the second sampler. That is, the cosine component calculating unit outputs the first item and the second item of the Formula 4 (line 3) of detection data E1(nT) with time division.

On the other hand, the sine component calculating unit includes a sign reverser, a selector, and a multiplier. The sine component calculating unit alternately calculates and outputs, as second detection data, quadrature-phase data multiplied by inphase data which is certain symbol times earlier than the quadrature-phase data and inphase data multiplied by quadrature-phase data which is certain symbol times earlier than the inphase data. That is, the sine component calculating unit outputs the first item and the second item of the Formula 5 (line 3) of detection data E2(nT) with time division.

The first and second post-detection filters respectively remove frequency components of the first and second detection data which are higher than a frequency being equal to ¼ of the sampling cycle. Therefore, unnecessary high-frequency components of the first detection data output from the cosine component calculating unit and the second detection data output from the sine component calculating unit are respectively removed by the first and the second post-detection filters. As a result, the same demodulated baseband signal as the conventional one is obtained.

The conventional differential detection calculating unit requires two delays, four multipliers, an adder, and a subtracter. On the other hand, the differential detection calculating unit of the present invention does not require two multipliers, one delay, one adder, and one subtracter among them, and instead has only two selectors and one sign reverser. It is needless to say that multipliers, adders, and subtracters need much more gate devices than selectors and sign reversers.

As apparent from the above description, the present differential detecting apparatus has a differential detection calculating unit which is achieved in a small circuit.

Each of the first and second post-detection filters may include a linear interpolating filter and an integral filter connected in series. The linear interpolating filter may obtain a moving average from successive three pieces of input data weighted by 1:2:1 and the integral filter may obtain an integral value from successive k pieces of input data.

The above construction achieves post-detection filters which are suitable for the present differential detection calculating unit and has high-quality detection performance without generating distortions by aliasing.

The linear interpolating filter may include two first averaging filters which are connected in series and each include a delay and an adder. The n-bit data is shifted down by one bit through lines before it enters the adder.

The above construction prevents overflows and achieves a linear interpolating filter with a simple circuit without multipliers.

The integral filter may include a second averaging filter, which has the same construction as the first averaging filter, and a third averaging filter being made up of a two-stage delay and an adder, the second and third averaging filters being connected in series. The n-bit data is shifted down by one bit through lines before it enters the adder.

The above construction prevents overflows and achieves an integral filter with a simple circuit without multipliers.

Owing to the above differential detection calculating unit and first and second post-detection filters which have been made compact, the present differential detecting apparatus, as a whole, is achieved in a small circuit which can be easily achieved in an IC.

Furthermore, judging the sign (±) of the two demodulated baseband signals output from the first and second post-detection filters achieves a demodulation with $\pi/4$-DQPSK (Differential Quadrature Phase Shift Keying).

The differential detecting apparatus may include third adding means for adding the first detection data to the second detection data, the third adding means being connected to the cosine component calculating unit and the first post-detection filter, and first subtracting means for obtaining a difference between the first detection data and the second detection data, the first subtracting means being connected to the sine component calculating unit and the second post-detection filter, and the first post-detection filter performing the above digital signal processing on data output from the third adding means instead of the first detection data using the formula of transfer function H1(z), and the second post-detection filter performing the digital signal processing on data output from the first subtracting means instead of the second detection data using the formula of transfer function H1(z).

The above construction enables a demodulation with DQPSK which is achieved by judging the sign (±) of the two demodulated baseband signals output from the first and second post-detection filters.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 4 is a table showing the time-series change of signals I(nT), Q(nT), S1(nT), S1{I(n−m)T}, S2(nT), F1(nT) and F2(nT) at times from T to 4T.

FIG. 5 shows detection data F1(nT) and F2(nT) output from differential detection calculating unit 3 and detection data E1(nT) and E2(nT) output from differential detection calculating unit 33 at times from T to 8T.

FIG. 6A shows wave forms of detection data F1(nT) of the differential detecting apparatus in the same embodiment.

FIG. 6B shows wave forms of demodulated baseband signal D1(nT) of the same differential detecting apparatus in the same embodiment.

FIG. 6C shows wave forms of detection data E1(nT) of the conventional differential detecting apparatus.

FIG. 6D shows wave forms of demodulated baseband signal C1(nT) of the conventional differential detecting apparatus.

DESCRIPTION OF THE PREFERRED EMBODIMENTS

<First Embodiment>

An embodiment of the differential detecting apparatus of the present invention is described below with reference to the drawings.

Figure 2:
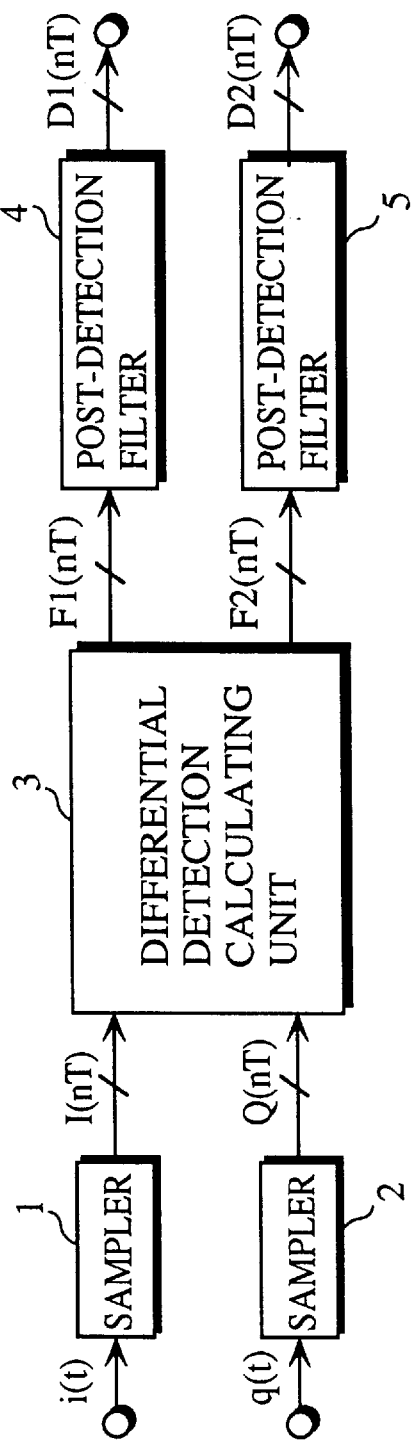
FIG. 2 is a block diagram illustrating the construction of the differential detecting apparatus in First Embodiment of the present invention.

FIG. 2 is a block diagram illustrating the construction of the differential detecting apparatus used in the first embodiment.

The present differential detecting apparatus includes the following main elements: two samplers 1 and 2, differential detection calculating unit 3, and two post-detection filters 4 and 5. This construction is the same as that of the conventional differential detecting apparatus shown in FIG. 1.

Sampler 1 samples inphase component i(t) of a baseband signal at intervals of time T, converts the component, and outputs inphase data I(nT) to differential detection calculating unit 3.

Similarly, sampler 2 samples quadrature-phase component q(t) of a baseband signal at intervals of time T synchronizing with sampler 1 and outputs quadrature-phase data Q(nT) to differential detection calculating unit 3.

Differential detection calculating unit 3 performs an operation being equal to Formulae 1 and 2 above on the two sampling baseband signals I(nT) and Q(nT) with time-division multiplexing. After the operation, the obtained detection data F1(nT) and F2(nT) are respectively output to post-detection filters 4 and 5.

Post-detection filters 4 and 5, being lowpass filters, remove unnecessary high-frequency components generated by samplers 1 and 2 through sampling. More specifically, these filters generate demodulated baseband signals D1(nT) and D2(nT) by removing the sidebands which are generated around frequencies being half of the sampling frequency multiplied by integers (0.5 n/T, where n=1, 2, . . . ). As a result, the transmitted information being equal to the phase difference between two adjacent symbols is demodulated.

Note that signals I(nT), Q(nT), F1(nT), F2(nT), D1(nT), and D2(nT) are all eight-bit data with a sign (±) and are transferred between blocks through eight-bit buses.

<Differential Detection Calculating Unit 3>

Now, differential detection calculating unit 3 is described in detail referring to the construction and operation.

Figure 3:
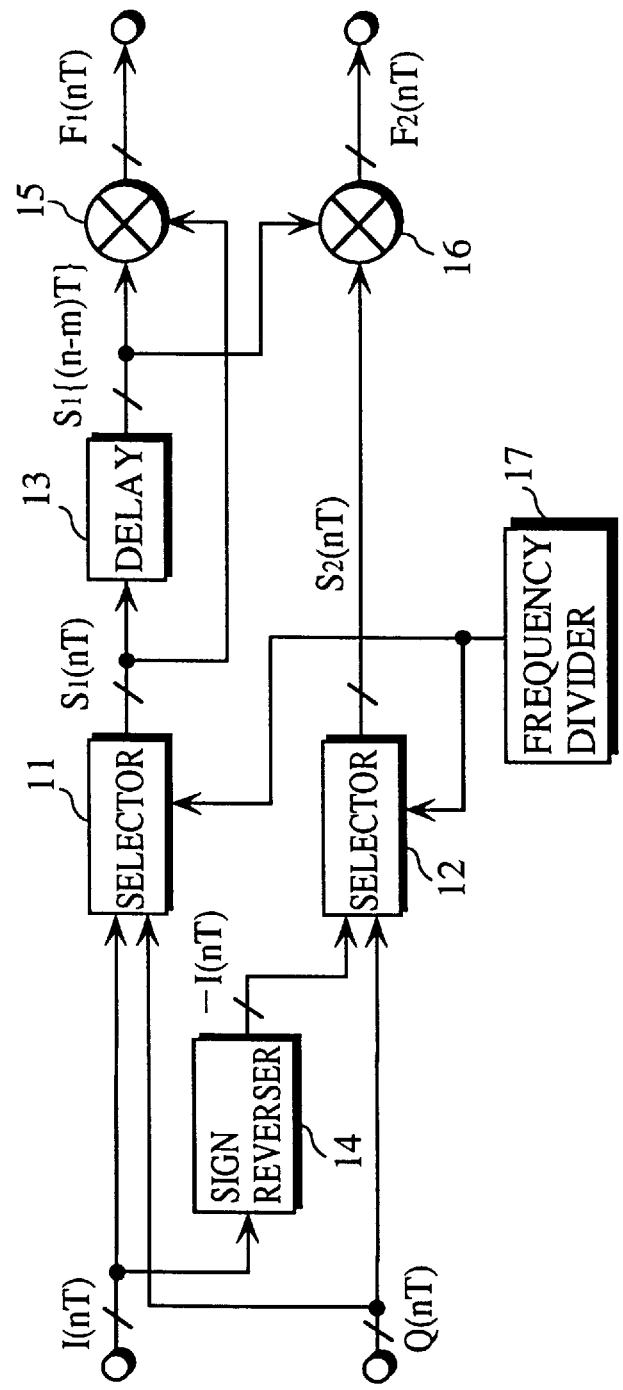
FIG. 3 is a block diagram illustrating the construction of differential detection calculating unit 3 in First Embodiment of the present invention.

FIG. 3 is a block diagram illustrating the detailed construction of differential detection calculating unit 3.

Differential detection calculating unit 3, including sign reverser 14, selectors 11 and 12, delay 13, multipliers 15 and 16, and frequency divider 17, performs differential detection operations by time-division multiplexing.

The elements shown in FIGS. 2 and 3 operate as follows synchronizing with a clock signal (not shown in the drawings).

Inphase data I(nT) is input to selector 11 and sign reverser 14.

Sign reverser 14 reverses a sign bit of eight-bit inphase data I(nT) and outputs reversed inphase data −I(nT) to selector 12.

Quadrature-phase data Q(nT) is input to selectors 11 and 12.

Frequency divider 17, being a flip-flop, divides the clock signal not shown in the drawing into two signals and outputs them as the selected signals respectively to selectors 11 and 12.

Selector 11, being a two-input, one-output multiplexer, lets inphase data I(nT) pass if the selected signal output from frequency divider 17 is high; quadrature-phase data Q(nT) if low. That is, selector 11 selects inphase data I(nT) and quadrature-phase data Q(nT) alternately at intervals of time T and outputs these data as data S1(nT) to delay 13 and multiplier 15.

Selector 12, being also a two-input, one-output multiplexer, lets quadrature-phase data Q(nT) pass if the selected signal output from frequency divider 17 is high; reversed inphase data −I(nT) if low. That is, selector 12 selects quadrature-phase data Q(nT) and reversed inphase data −I(nT) alternately at intervals of time T and outputs these data as data S2(nT) to multiplier 16.

Delay 13, being an eight-bit, m-stage shift register, outputs data S1(nT) output from selector 11 to multipliers 15 and 16 by delaying it for one symbol time mT.

The delayed data S1{(n−m)T} is multiplied by data S1(nT) in multiplier 15 and the result, which is represented by the following formula, is output as detection data F1(nT):

Formula 6

$$F1(nT)=S1(nT)*S1\{(n-m)T\}.$$

The delayed data S1{(n−m)T} is multiplied by data S2(nT) in multiplier 16 and the result, which is represented by the following formula, is output as detection data F2(nT):

Formula 7

$$F2(nT)=S2(nT)*S2\{(n-m)T\}.$$

FIG. 4 shows the values of the above signal data I(nT), Q(nT), S1(nT), S1{(n−m)T}, S2(nT), F1(nT), and F2(nT) taken at times from T to 4T, where m is 4, that is, one symbol time mT is four times the sampling cycle T.

For example, at time T in the drawing, S1(nT) output from selector 11 is I(T), S1{(n−m)T} output from delay 13 I(−3T), S2(nT) output from selector 12 Q(T), F1(nT) output from multiplier 15 I(T)*I(−3T), and F2(nT) output from multiplier 16 I(−3T)*Q(T).

Figure 1:
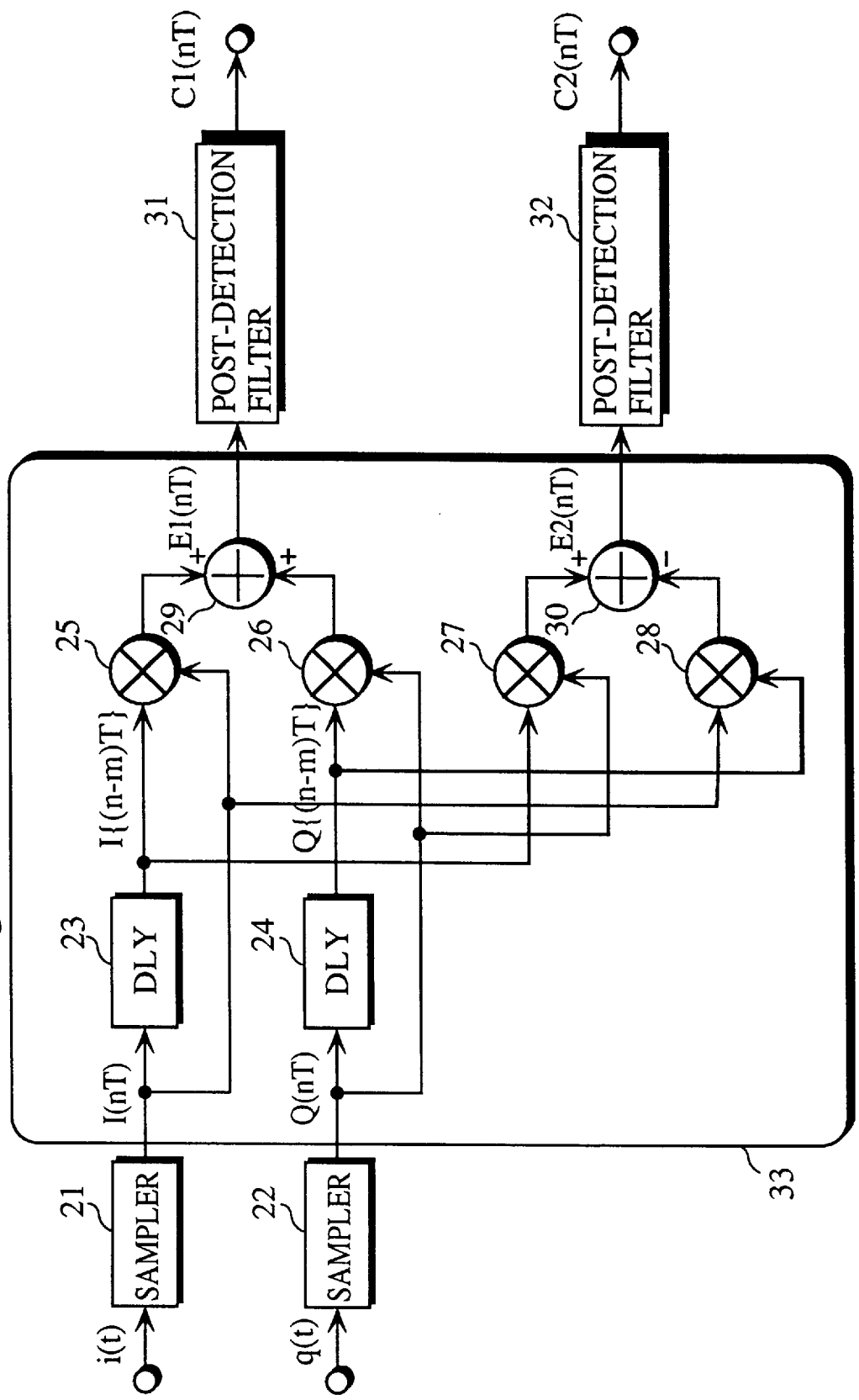
FIG. 1 is a block diagram illustrating the construction of the conventional differential detecting apparatus.

FIG. 5 is a comparison table for detection data F1(nT) and F2(nT) output from differential detection calculating unit 3 and detection data E1(nT) and E2(nT) output from the conventional differential detection calculating unit 33 shown in FIG. 1. Note that sampling cycle T for differential detection calculating unit 3 equals to half of the sampling cycle T for the conventional differential detection calculating unit 33. This comes from the difference in the performance between the present and the conventional units 3 and 33. Accordingly, the number of samples per symbol is four for the present differential detection calculating unit 3, while the number is two for the conventional one.

As shown in FIG. 5, detection data F1(nT) alternately takes a multiplication result of inphase data, I(nT)*I{(n−m)T}, and a multiplication result of quadrature-phase data, Q(nT)*Q{(n−m)T}, at each sampling time. On the other hand, the conventional detection data E1(nT) takes the addition result of I(nT)*I{(n−m)T} and Q(nT)*Q{(n−m)T} at every second sampling time.

Similarly, detection data F2(nT) alternately takes a multiplication result of inphase and quadrature-phase data, I{(n−m)T}*Q(nT), and a multiplication result of inphase and quadrature-phase data, −I(nT)*Q{(n−m)T}, at each sampling time. The conventional detection data E2(nT) takes the addition result of I{(n−m)T}*Q(nT) and −I(nT)*Q{(n−m)T} at every second sampling time.

The above description indicates that detection data F1(nT) of the present embodiment alternately takes with time division a value being equal to the first item or the second item of the conventional detection data E1(nT). Similarly, detection data F2(nT) of the present embodiment alternately takes with time division a value being equal to the first item or the second item of the conventional detection data E2(nT).

The above characteristic can also be described as follows: each detection data F1(nT) and F2(nT) has two different elements and alternately takes the forms of these elements at each sampling time; and the same element is output at every second sampling time. That is, each element of each detection data F1(nT) and F2(nT) is updated at every second sampling time and this update speed is equal to that of the conventional detection data E1(nT) and E2(nT).

The above conclusion indicates that differential detection calculating unit 3 and the conventional differential detection calculating unit 33 operate the same. Also, these units output the same signals through the same post-detection filters. Therefore, sampling cycle T for differential detection calculating unit 3 equals to half of the sampling cycle T for the conventional differential detection calculating unit 33.

Now, the principle of the generation of demodulated baseband signals D1(nT) and D2(nT) is described. Note that it is assumed for convenience that both the present post-detection filters 4 and 5 and the conventional post-detection filters 31 and 32 are ideal lowpass filters, that is, both filters perfectly remove unnecessary high-frequency components generated through sampling.

FIGS. 6A, 6B, 6C, and 6D respectively show waveforms of detection data F1(nT) being a signal input into post-detection filter 4, demodulated baseband signal D1(nT) output from this filter, detection data E1(nT) being a signal input into conventional post-detection filter 31, and demodulated baseband signal C1(nT) output from the conventional filter. These waveforms represent the signal values at time from T to 8T shown in FIG. 5.

Figure 6:
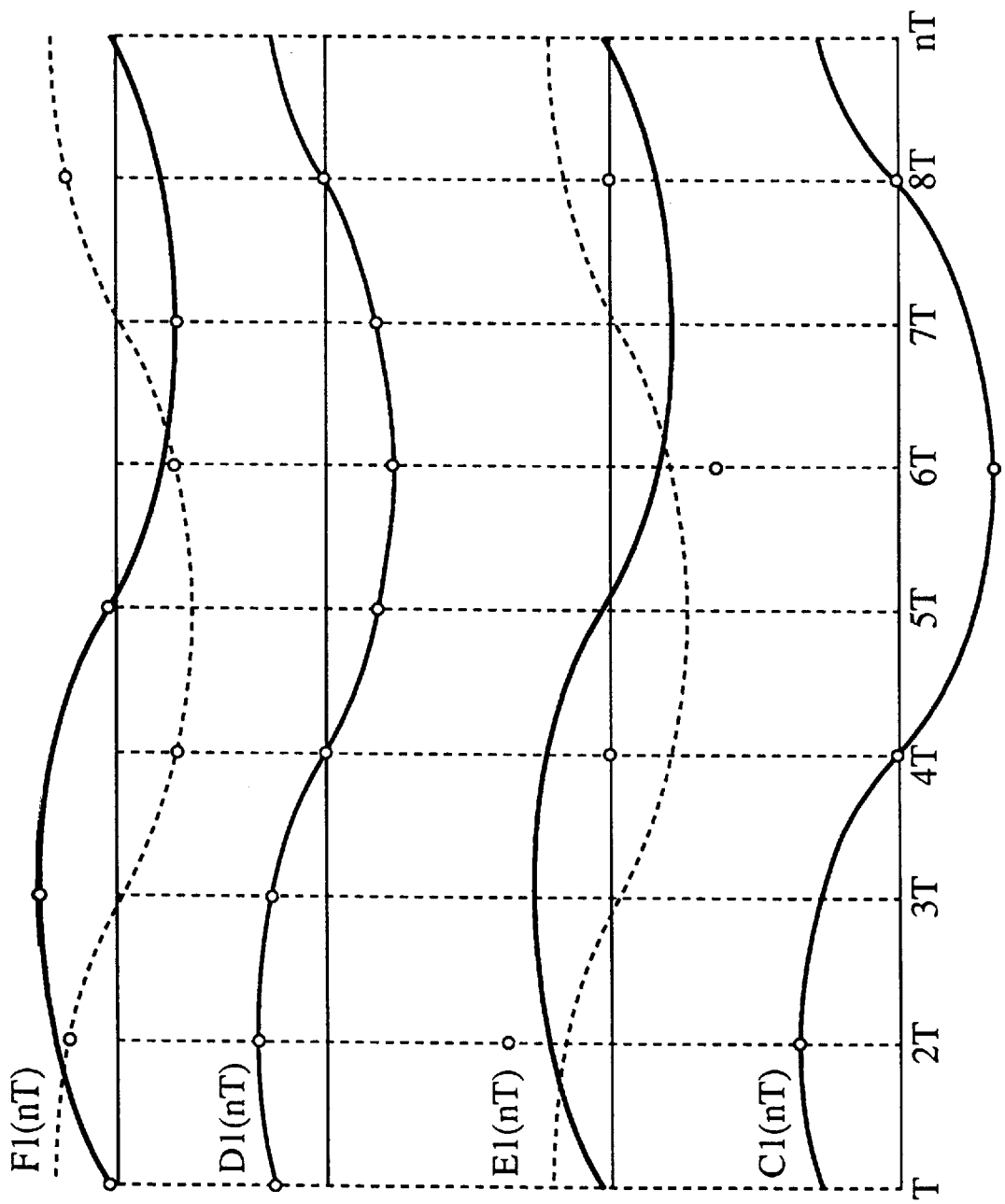
FIG. 6 shows the wave forms of the detection signals and demodulated baseband signals in First Embodiment of the present invention.

Now, it is assumed that each sign ○ on the solid line of FIG. 6A represents the multiplication result of inphase data, I(nT)*I{(n−m)T}, and each sign ○ on the dotted line the multiplication result of quadrature-phase data, Q(nT)*Q{(n−m)T}. Then, each sign ○ in FIG. 6C represents the conventional detection data E1(nT). The value is equal to the addition result of the values on the solid and dotted lines of FIG. 6A at the same time (2T, 4T, . . . ) because the conventional detection data E1(nT) is the addition result of inphase data multiplication result I(nT)*I{(n−m)T} and quadrature-phase data multiplication result Q(nT)*Q{(n−m)T}.

Demodulated baseband signal C1(nT) output from post-detection filter 31 includes only baseband frequency component and accordingly represented by signs ○ on the solid line of FIG. 6D, which is equal to the cosine component of the phase difference between two adjacent symbols of the original modulated wave since the filter removes all the unnecessary sidebands included in detection data E1(nT).

Demodulated baseband signal D1(nT) output from post-detection filter 4 includes only baseband frequency component and accordingly represented by signs ○ on the solid line of FIG. 6B, which is equal to the cosine component of the phase difference between two adjacent symbols of the original modulated wave since post-detection filter 4 has the same frequency characteristic as post-detection filter 31 and the filter removes all the unnecessary sidebands included in detection data F1(nT).

The solid line of FIG. 6B is equal to that of FIG. 6D. That is, detection data F1(nT) becomes demodulated baseband signal D1(nT) being equal to the conventional demodulated baseband signal C1(nT) after post-detection filter 4 removes unnecessary high-frequency components from F1(nT).

As described above, detection data F1(nT) and E1(nT) having different waveforms respectively become signals having the same waveform after they pass the same filters. The reason is described below.

The two elements of detection data F1(nT) (solid line and dotted line in FIG. 6A) and detection data E1(nT) have the following relation in common: (1) the addition result of the two elements is equal to detection data E1(nT); (2) both of the two elements and detection data E1(nT) have been sampled with the same frequency (0.5/T); and (3) the two elements have been sampled with interval T.

The above relation leads to the following observation: detection data F1(nT) and E1(nT) has the same baseband frequency component and even-number high-frequency component (sidebands around frequencies 1/T, 2/T, 3/T, . . . ) and different odd-number high-frequency components (sidebands around frequencies 0.5/T, 1.5/T, 2.5/T, . . . ).

As a result, it can be said that detection data F1(nT) and E1(nT) respectively become a signal which is equal to the cosine component of the phase difference between two adjacent symbols of the original modulated wave since the post-detection filters 4 and 31 remove all the unnecessary sidebands except common baseband frequency components.

Similarly, demodulated baseband signal D2(nT) is obtained from detection data F2(nT) through the second post-detection filter 5 on the same principle.

As apparent from the above description, differential detection calculating unit 3 of the present embodiment is achieved in a smaller circuit than that for the conventional differential detection calculating unit 33 though both units have the same function.

More specifically, differential detection calculating unit 3 of the present embodiment does not require two multipliers, one delay, one adder, and one subtracter required in the conventional differential detection calculating unit 33 by adding only two selectors (11 and 12), one sign reverser (14), and one frequency divider (17) instead. It is needless to say that multipliers, adders, and subtracters need much more gate devices than selectors, sign reversers, and frequency dividers.

Demodulated baseband signals D1(nT) and D2(nT) are respectively equal to the cosine component and the sine component of the phase difference between two adjacent symbols of the original modulated signal. Therefore, an arbitrary phase-modulated signal can be demodulated since a phase difference is determined by these two signals D1(nT) and D2(nT).

Specifically, judging the sign (±) of the two signals D1(nT) and D2(nT) achieves a demodulation with π/4-DQPSK (Differential Quadrature Phase Shift Keying). This is because each of four kinds of phase differences, π/4, 3π/4, 5π/4, and 7π/4, corresponds to each of the combinations of the cosine and sine components and positive and negative signs. Accordingly, the differential detecting apparatus of the present embodiment is most suitable for the demodulation with π/4-DQPSK.

Similarly: judging the sign (±) of D1(nT)+D2(nT) and D1(nT)−D2(nT) achieves a demodulation with DQPSK; judging the sign of only D1(nT) achieves a demodulation with DBPSK (Differential Binary Phase Shift Keying); and judging the sign of only D2(nT) achieves a demodulation with π/2-DBPSK.

<Post-Detection Filters 4 and 5>

Now, post-detection filters 4 and 5 are described in detail referring to the construction and filter characteristics.

Figure 7:
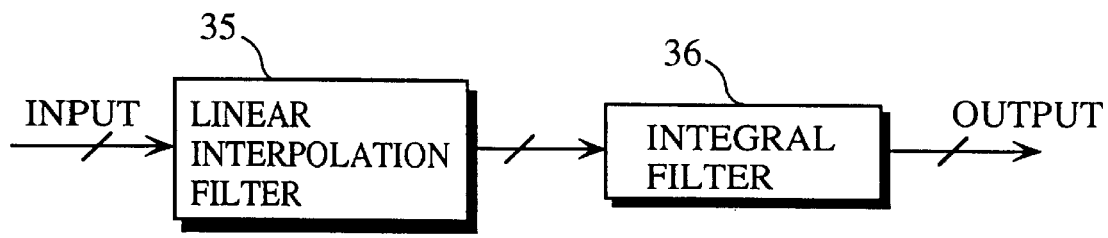
FIG. 7 is a block diagram illustrating the construction of post-detection filters 4 and 5.

FIG. 7 is a block diagram illustrating the detailed construction of post-detection filters 4 and 5.

Post-detection filters 4 and 5 have the same construction and include linear interpolation filter 35 and integral filter 36.

Figure 8:
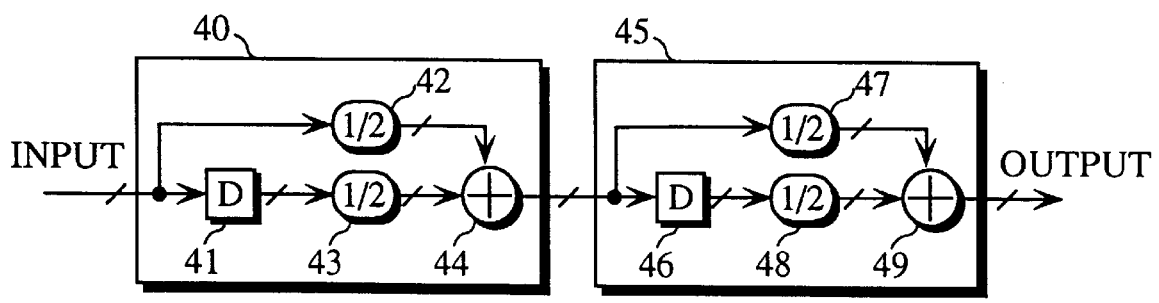
FIG. 8 is a block diagram illustrating the construction of linear interpolating filter 35.

Linear interpolation filter 35 is, as shown in FIG. 8, made up of two filters 40 and 45 connected in series.

Filters 40 and 45 have the same construction.

41 and 46 represent registers for delaying one sampling time T. Also, 42, 43, 47, and 48 represent ½ coefficient multiplying means, and 44 and 49 adders. Note that coefficient multiplying means 42, 43, 47, and 48 are not logical circuits but distributing means including lines connected so that eight-bit data is shifted down by one bit.

Filters 40 and 45 add a half of an input data value to a half of an input data value one sampling time earlier and output the result. Specifically, filters 40 and 45 use the following Formula 8 of z conversion of transfer functions H40(z) and H45(z):

Formula 8

$$H40(z)=(1+z^{-1})/2$$

$$H45(z)=(1+z^{-1})/2.$$

Hence, linear interpolation filter 35 being made up of filters 40 and 45 connected in series uses the following Formula 9 of transfer function H35(z):

Formula 9

$$\begin{aligned}H35(z) &= H40(z)*H45(z) \\ &= (1+2z^{-1}+z^{-2})/4.\end{aligned}$$

As the above formula indicates, linear interpolation filter 35 outputs an addition result of a quarter of an input data value, a half of an input data value two sampling times earlier, and a quarter of an input data value four sampling times earlier. This output value equals to a weighted moving average around a piece of data one sampling time earlier.

Suppose detection data F1(nT) shown in FIG. 5 is input. The linear interpolation filter 35 outputs the value obtained from the following Formula 10, for example, at time 3T:

Formula 10

$$I(T)*I(-3T)/4+Q(2T)*Q(-2T)/2+I(3T)*I(-T)/4.$$

The second item of Formula 10 equals to Q(nT)*Q{(n−m)T} at time 2T. The addition result of the first and the third items can be interpreted as a piece of sampling data at around time 2T, that is, a signal, being equal to I(nT)*I{(n−m)T}, generated by linear interpolation by using the mean value of a plurality pieces of sampling data at times T and 3T. Hence, Formula 10 can also be expressed as Q(nT)*Q{(n−m)T}+I(nT)*I{(n−m)T}. As a result, this value is nearly equal to the conventional detection data E1(nT) at time 2T.

The above relation applies to detection data F2(nT) as well as to detection data F1(nT). Therefore, detection data F1(nT) and F2(nT) output from differential detection calculating unit 3 is converted, by linear interpolation filter 35, to a signal being equal to detection data E1(nT) and E2(nT) output from differential detection calculating unit 33.

As is clear from the above description, linear interpolation filter 35 is suitable for differential detection calculating unit 3 which is made up of small-scale circuits.

Meanwhile, as shown in FIG. 8, two sampling signals are multiplied by a coefficient "½" by coefficient multiplying means 42, 43, 47, and 48 before they are added by adders 44 and 49. This prevents an overflow which occurs in a filter circuit when a signal with a very high amplitude is input.

Coefficient multiplying means 42, 43, 47, and 48 are made more compact than standard digital filters since they are achieved with only lines and do not require circuit components.

Now, integral filter 36 is described in detail referring to the construction and operation.

Figure 9:
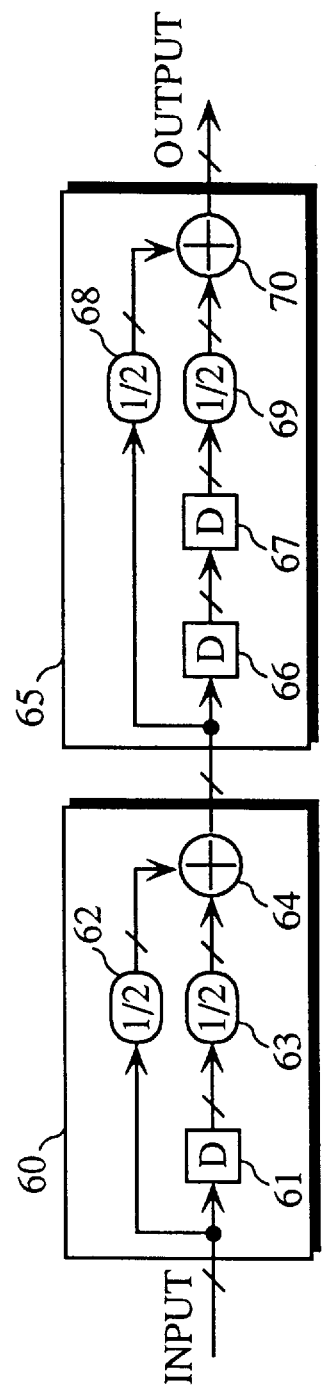
FIG. 9 is a block diagram illustrating the construction of integral filter 36.

Integral filter 36 is, as shown in FIG. 9, made up of two filters 60 and 65 connected in series.

61, 66, and 67 represent registers for delaying one sampling time T. Also, 62, 63, 68, and 69 represent ½ coefficient multiplying means, and 64 and 70 adders. Note that coefficient multiplying means 62, 63, 68, and 69 are, as coefficient multiplying means 42, 43, 47, and 48, not logical circuits but distributing means including lines connected for shifting eight-bit data by one bit.

Filter 60, having the same construction as filters 40 and 45, uses the following Formula 11 of transfer function H60(z):

Formula 11

$$H60(z) = (1+z^{-1})/2.$$

Filter 65 outputs an addition result of a half of an input data value and a half of an input data value two sampling times earlier. Hence, filter 65 uses the following Formula 12 of transfer function H65(z):

Formula 12

$$H65(z) = (1+z^{-2})/2.$$

Hence, integral filter 36 being made up of filters 60 and 65 connected in series uses the following Formula 13 of transfer function H36(z):

Formula 13

$$\begin{aligned} H36(z) &= H60(z)*H65(z) \\ &= (1+z^{-1}+z^{-2}+z^{-3})/4. \end{aligned}$$

As the above formula indicates, integral filter 36 outputs a moving average value of four continuous pieces of input data. In other words, the filter 36 performs an integral on signals input during time period 4T.

The basic function of integral filter 36 is to remove unnecessary high-frequency components generated by the sampling by differential detection calculating unit 3, that is, to decrease the frequency components which generate distortions by aliasing. If such components remain in the demodulated baseband signals, a smooth, demodulated baseband signal D1(nT) as shown in FIG. 6B is not obtained and the signal contains saw-tooth-wave noises, namely distortions by aliasing.

Figure 10:
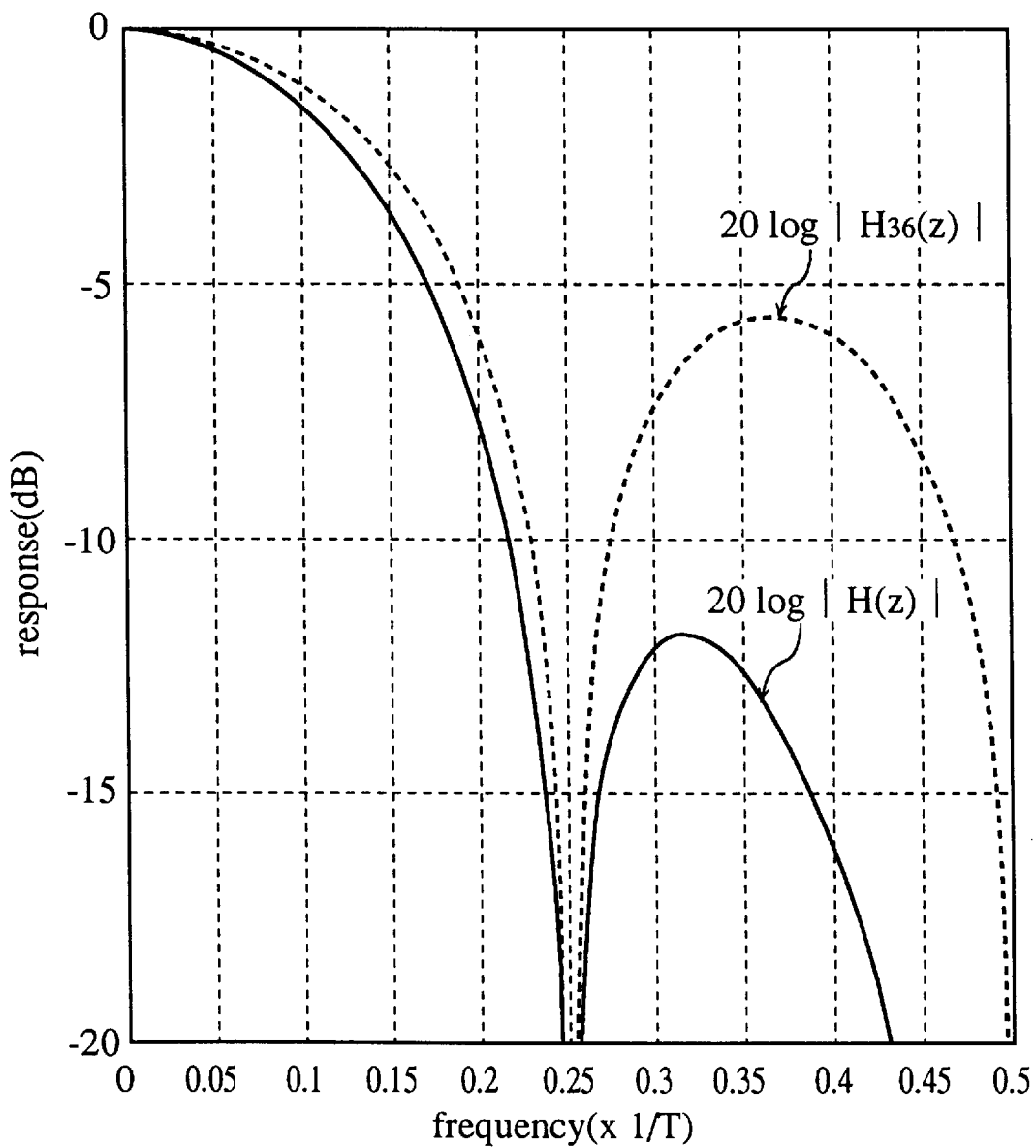
FIG. 10 shows the frequency characteristics of post-detection filters 4 and 5 by the solid line, and the frequency characteristics of integral filter 36 by the dotted line.

The frequency response (amplitude characteristics) of integral filter 36 is represented by the dotted line in FIG. 10. The frequency response is obtained by substituting $z=e^{-j2\pi fT}$ for the transfer function of Formula 13 and plotting the relation between f and 20log|H36(z)|.

As the amplitude characteristics represented in the dotted line in FIG. 10 indicates, a frequency component higher than the half (0.25/T) of a substantial sampling frequency (0.5/T) is decreased. It is determined that the substantial sampling frequency (0.5/T) is half of the sampling frequency (1/T) since two components making up each of detection data F1(nT) and F2(nT) are alternately output from differential detection calculating unit 3 at every second sampling time, as is shown in FIG. 5.

Now, the amplitude characteristics of post-detection filters 4 and 5, which each include linear interpolation filter 35 and integral filter 36, is described.

Post-detection filters 4 and 5 use the following formula of transfer function H(z) which is obtained from Formulae 9 and 13:

Formula 14

$$\begin{aligned} H(z) &= H35(z)*H36(z) \\ &= (1+2z^{-1}+z^{-2})/4 * (1+z^{-1}+z^{-2}+z^{-3})/4. \end{aligned}$$

Hence, by substituting $z=e^{-j2\pi fT}$ for Formula 14, the frequency response (amplitude characteristics) of post-detection filters 4 and 5 is obtained. The frequency response is represented by the solid line of FIG. 10.

As is shown in FIG. 10, the frequency component (a frequency component higher than frequency 0.25/T) which generates distortions by aliasing reaches about −6dB at its maximum on the dotted line (amplitude characteristics of only integral filter 36) and reaches about −12 dB at its maximum on the solid line (amplitude characteristics of post-detection filters 4 and 5).

The above observation indicates that post-detection filters 4 and 5 decrease more unnecessary frequency components than only integral filter 36. This effect of post-detection filters 4 and 5 is generated by their construction in which linear interpolation filter 35 and integral filter 36 are connected in series.

Detection data F1(nT) and F2(nT) output from differential detection calculating unit 3 is, by passing through post-detection filters 4 and 5, demodulated and becomes demodulated baseband signals D1(nT) and D2(nT) which are respectively equal to the cosine component and the sine component of the phase difference between two adjacent symbols in the original modulated wave.

Figure 11:
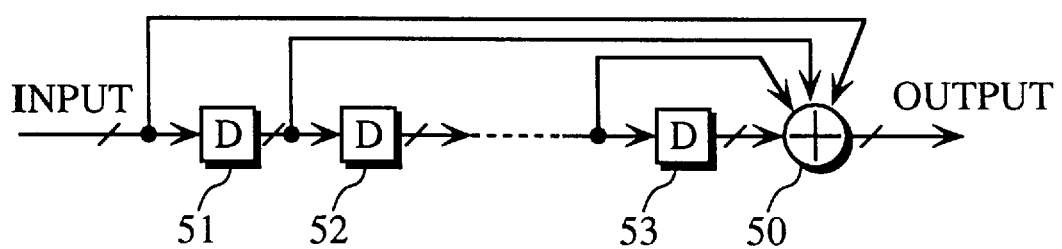
FIG. 11 is a block diagram illustrating another construction of integral filter 36.

In the present embodiment, integral filter 36 outputs a result of an integral operated on data pieces input in succession during time period 4T. However, the number of data pieces is not limited to four. For example, the filter may be a transversal filter shown in FIG. 11 which does not include a multiplier. This filter includes (k−1) delays 51, 52, . . . , 53 and adder 50 for adding k input signals and outputs a result of an integral operated on k pieces of input data.

In the present embodiment, k is four. The reason is described below.

This value k is a factor that determines the cut-off frequency of the filter. Therefore, an appropriate value should be selected for k by considering the factors such as the sampling frequency, modulation method, and noise conditions. Generally, value k is determined so that kT becomes one symbol time. For the present invention, an even number is suitable for k since the two signals output from differential detection calculating unit 3 are alternately selected. The smaller k is, the smaller the circuit scale is. However, if k=2, the cut-off frequency is so high that detection data generates distortions by aliasing and decreases the detection performance. For the above reasons, four is suitable for k to make both circuit scale and detection performance conditions better.

Integral filter 36 has the same advantage as linear interpolation filter 35 owing to its construction as shown in FIG. 9. That is, integral filter 36 is achieved in a small-scale circuit since overflows are prevented from occurring in adders 64 and 70 and no special multiplier is required to multiply a coefficient "½."

In the present embodiment, delay 13 of differential detection calculating unit 3 delays one symbol time, namely m sampling time. However, delay 13 may delay the symbol time multiplied by integers. In this case, the differential detection apparatus detects the phase difference between integer-multiplied symbols of the modulated signal.

<Second Embodiment>

The differential detecting apparatus in the second embodiment of the present invention is explained with reference to the figures.

The differential detecting apparatus is suitable for DQPSK modulation method.

Figure 12:
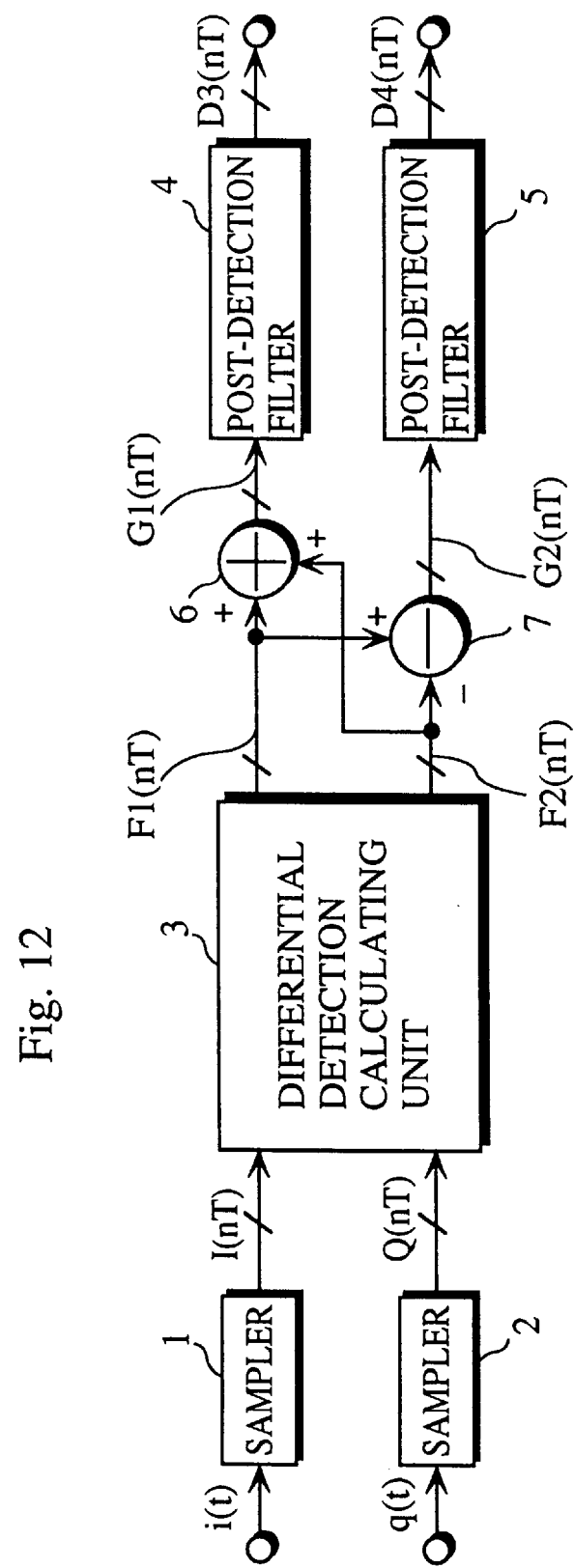
FIG. 12 is a block diagram illustrating the construction of the differential detecting apparatus in Second Embodiment of the present invention.

FIG. 12 is a block diagram showing the construction of the differential detection apparatus of the second embodiment.

In the drawing, the same elements as those of the apparatus of the first embodiment shown in FIG. 2 have the same numbers. The same elements are not described here.

When compared to the apparatus of the first embodiment, the apparatus of the second embodiment additionally has adder 6 between differential detection calculating unit 3 and post-detection filter 4 and adder 7 between differential detection calculating unit 3 and post-detection filter 4.

With the above construction, detection data F1(nT) is added to detection data F2(nT) by adder 6 after these data pieces are output from differential detection calculating unit 3. The adder 6 outputs signal G1(nT) to post-detection filter 4. The signal G1(nT) is given by the following formula:
Formula 15

$$G1(nT)=F1(nT)+F2(nT).$$

On the other hand, detection data F1(nT) is subtracted by detection data F2(nT) by adder 7 after these data pieces are output from differential detection calculating unit 3. The adder 7 outputs signal G2(nT) to post-detection filter 5. The signal G2(nT) is given by the following formula:
Formula 16

$$G1(nT)=F1(nT)-F2(nT).$$

As a result, judging the sign (±) of the two demodulated baseband signals D3(nT) and D4(nT) achieves a demodulation with DQPSK. The reason is described below.

Suppose the phase difference of the modulated signal is (θ1−θ2). Then, the signals G1(nT) and G2(nT) respectively given by Formulae 15 and 16 above are also given by the following formula:
Formula 17

$$G1(nT)=\cos(θ1-θ2)+\sin(θ1-θ2)$$

$$G2(nT)=\cos(θ1-θ2)-\sin(θ1-θ2).$$

Accordingly, the four kinds of phase differences 0, π/2, π, and 3π/2 in DQPSK modulation method respectively correspond to (1,1), (1,−1), (−1,−1), and (−1,1) for (G1(nT), G2(nT)) of the above signals. Hence, the phase differences 0, π/2, π, and 3π/2 of the modulated signal respectively correspond to (+,+), (+,−), (−,−), and (−,+) for (D3(nT),D4(nT)) of the demodulated baseband signals.

It is needless to say that whether the demodulated baseband signals D3(nT) and D4(nT) have a positive sign or a negative sign can be judged by judging the logical value of the Most Significant Bit (MSB) of the signals since the signals are eight-bit data, as is described above.

As apparent from the above description, the differential detecting apparatus of the present embodiment is suitable for DQPSK modulation method since a demodulation with DQPSK modulation method is achieved by judging the sign of the demodulated baseband signals D3(nT) and D4(nT).

The differential detecting apparatus of the present invention has been explained over two embodiments. However, the present invention is not limited to the above embodiments. That is:

(1) though each digital signal used in the above embodiments is eight-bit data, the signal is not limited to such an accuracy or representation format; and (2) though the number of samples per symbol, namely m, is four in the above embodiments, the number may be any integer being two or more.

What is claimed is:

1. A differential detecting apparatus for generating a demodulated baseband signal of a phase-modulated signal from an inphase baseband signal and a quadrature-phase baseband signal which are obtained by performing a quadrature detection on the phase-modulated signal, wherein the demodulated baseband signal represents a phase difference between two symbols of the phase-modulated signal with certain symbol times in between, wherein a symbol time corresponds to a symbol which is a unit piece of information of the phase-modulated signal, the differential detecting apparatus comprising:

a first sampler for sampling and digitizing the inphase baseband signal at intervals of a sampling cycle shorter than one symbol time;

a second sampler for sampling and digitizing the quadrature-phase baseband signal at intervals of a sampling cycle shorter than one symbol time, wherein the first sampler and the second sampler synchronize with each other in operation;

differential detection calculating means including a cosine component calculating unit for alternately calculating and outputting, as first detection data, first inphase data multiplied by second inphase data and first quadrature-phase data multiplied by second quadrature-phase data at intervals of the sampling cycle, wherein the first inphase data and the second inphase data are both output from the first sampler and the first inphase data is output earlier than the second inphase data by the certain symbol times, and wherein the first quadrature-phase data and the second quadrature-phase data are both output from the second sampler and the first quadrature-phase data is output earlier than the second quadrature-phase data by the certain symbol times, and a sine component calculating unit for alternatively calculating and outputting, as second detection data, the first inphase data multiplied by the second quadrature-phase data and the first quadrature-phase data multiplied by the second inphase data at intervals of the sampling cycle;

a first post-detection filter for generating a first component by performing digital signal processing on the first detection data using the following formula of transfer function H1(z)

$$H1(z) = \alpha(1 + 2z^{-1} + z^{-2})*\beta \sum_{i=0}^{k-1} z^{-i}$$

where α and β are constants, and i and k integers; and a second post-detection filter for generating a second component by performing the digital signal processing on the second detection data using the formula of transfer function H1(z), wherein the first component and the second component make up the demodulated baseband signal.

2. The differential detecting apparatus of claim 1, wherein each of the first post-detection filter and the second post-detection filter includes a linear interpolation filter represented by the following formula of transfer function H2(z)

$$H2(z)=\alpha(1+2z^{-1}+z^{-2})$$

and an integral filter represented by the following formula of transfer function H3(z)

$$H3(z) = \beta \sum_{i=0}^{k-1} z^{-i}.$$

3. The differential detecting apparatus of claim 2, wherein the linear interpolation filter includes two first averaging filters which are connected in series and each are represented by the following formula of transfer function H4(z)

$$H4(z)=(1+z^{-1})/2.$$

4. The differential detecting apparatus of claim 3, wherein k used in the transfer function H3(z) of the integral filter is four, wherein
the integral filter includes a second averaging filter represented by the following formula of transfer function H5(z)

$$H5(z)=(1+z^{-1})/2$$

and a third averaging filter represented by the following formula of transfer function H6(z)

$$H6(z)=(1+z^{-2})/2.$$

5. The differential detecting apparatus of claim 4, wherein
each of the first averaging filter and the second averaging filter includes:
first delay means for delaying input data by one sampling cycle;
two first multiplying means for multiplying the input data with ½ and multiplying data output from the first delay means with ½; and
first adding means for adding data output from one of the two first multiplying means to data output from the other of the two first multiplying means, wherein
the third averaging filter includes:
second delay means for delaying the input data by two sampling cycles;
two second multiplying means for multiplying the input data with ½ and multiplying data output from the second delay means with ½; and
second adding means for adding data output from one of the two second multiplying means to data output from the other of the two second multiplying means.

6. The differential detecting apparatus of claim 5, wherein
the first delay means is an n-bit register, and
the second delay means is an n-bit, two-stage shift register, and
the first multiplying means and the second multiplying means are signal lines connected so that n-bit data is shifted down by one bit, and
the first adding means and the second adding means are each an adder for adding a piece of n-bit data to another piece of n-bit data.

7. The differential detecting apparatus of claim 6, wherein
the cosine component calculating unit includes:
a first selector for alternately selecting the inphase data and the quadrature-phase data at intervals of the sampling cycle;
third delay means for delaying the data selected by the first selector for the certain number of symbol times and outputting the data; and
third multiplying means for, each time the first selector selects the data, multiplying the selected data with the data output from the third delay means and outputting a result of the multiplication as the first detection data, wherein
the sine component calculating unit includes:
sign reversing means for reversing a sign of the inphase data;
a second selector for alternately selecting the quadrature-phase data and the inphase data with the reversed sign at intervals of the sampling cycle, wherein the second selector selects the quadrature-phase data when the first selector selects the inphase data, and the second selector selects the inphase data with the reversed sign when the first selector selects the quadrature-phase data; and fourth multiplying means for, each time the second selector selects the data, multiplying the selected data with the data output from the third delay means and outputting a result of the multiplication as the second detection data.

8. The differential detecting apparatus of claim 3, wherein
k used in the transfer function H3(z) of the integral filter is equal to the number of samples per symbol time sampled by the first sampler.

9. The differential detecting apparatus of claim 1 further comprising:
post-detection adding means for adding the first detection data to the second detection data, the post-detection adding means being connected to the cosine component calculating unit and the first post-detection filter; and
post-detection subtracting means for obtaining a difference between the first detection data and the second detection data, the post-detection subtracting means being connected to the sine component calculating unit and the second post-detection filter, wherein
the first post-detection filter performs the digital signal processing on data output from the post-detection adding means instead of the first detection data using the formula of transfer function H1(z), wherein
the second post-detection filter performs the digital signal processing on data output from the post-detection subtracting means instead of the second detection data using the formula of transfer function H1(z).

10. The differential detecting apparatus of claim 9, wherein
each of the first post-detection filter and the second post-detection filter includes a linear interpolation filter represented by the following formula of transfer function H2(z)

$$H2(z)=\alpha(1+2z^{-1}+z^{-2})$$

and an integral filter represented by the following formula of transfer function H3(z)

$$H3(z) = \beta \sum_{i=0}^{k-1} z^{-i}.$$

11. The differential detecting apparatus of claim 10, wherein
the linear interpolation filter includes two first averaging filters which are connected in series and each are represented by the following formula of transfer function H4(z)

$$H4(z)=(1+z^{-1})/2.$$

12. The differential detecting apparatus of claim 11, wherein
k used in the transfer function H3(z) of the integral filter is four, wherein
the integral filter includes a second averaging filter represented by the following formula of transfer function H5(z)

$$H5(z)=(1+z^{-1})/2$$

and a third averaging filter represented by the following formula of transfer function H6(z)

$$H6(z)=(1+z^{-2})/2.$$

13. The differential detecting apparatus of claim 12, wherein each of the first averaging filter and the second averaging filter includes:
first delay means for delaying input data by one sampling cycle;
two first multiplying means for multiplying the input data with ½ and multiplying data output from the first delay means with ½; and
first adding means for adding data output from one of the two first multiplying means to data output from the other of the two first multiplying means, wherein the third averaging filter includes:
second delay means for delaying the input data by two sampling cycles;
two second multiplying means for multiplying the input data with ½ and multiplying data output from the second delay means with ½; and
second adding means for adding data output from one of the two second multiplying means to data output from the other of the two second multiplying means.

14. The differential detecting apparatus of claim 13, wherein the first delay means is an n-bit register, and the second delay means is an n-bit, two-stage shift register, and the first multiplying means and the second multiplying means are signal lines connected so that n-bit data is shifted down by one bit, and the first adding means and the second adding means are each an adder for adding a piece of n-bit data to another piece of n-bit data.

15. The differential detecting apparatus of claim 14, wherein the cosine component calculating unit includes:
a first selector for alternately selecting the inphase data and the quadrature-phase data at intervals of the sampling cycle;
third delay means for delaying the data selected by the first selector for the certain number of symbol times and outputting the data; and
third multiplying means for, each time the first selector selects the data, multiplying the selected data with the data output from the third delay means and outputting a result of the multiplication as the first detection data, wherein the sine component calculating unit includes:
sign reversing means for reversing a sign of the inphase data;
a second selector for alternately selecting the quadrature-phase data and the inphase data with the reversed sign at intervals of the sampling cycle, wherein the second selector selects the quadrature-phase data when the first selector selects the inphase data, and the second selector selects the inphase data with the reversed sign when the first selector selects the quadrature-phase data; and
fourth multiplying means for, each time the second selector selects the data, multiplying the selected data with the data output from the third delay means and outputting a result of the multiplication as the second detection data.

16. The differential detecting apparatus of claim 11, wherein k used in the transfer function $H_3(z)$ of the integral filter is equal to the number of samples per symbol time sampled by the first sampler.

17. A differential detecting apparatus for generating a demodulated baseband signal of a phase-modulated signal from an inphase baseband signal and a quadrature-phase baseband signal which are obtained by performing a quadrature detection on the phase-modulated signal, wherein the demodulated baseband signal represents a phase difference between two symbols of the phase-modulated signal with certain symbol times in between, wherein a symbol time corresponds to a symbol which is a unit piece of information of the phase-modulated signal, the differential detecting apparatus comprising:

a first sampler for sampling and digitizing the inphase baseband signal at intervals of a sampling cycle shorter than one symbol time;

a second sampler for sampling and digitizing the quadrature-phase baseband signal at intervals of a sampling cycle shorter than one symbol time, wherein the first sampler and the second sampler synchronize with each other in operation;

differential detection calculating means including
a cosine component calculating unit for alternately calculating and outputting, as first detection data, first inphase data multiplied by second inphase data and first quadrature-phase data multiplied by second quadrature-phase data at intervals of the sampling cycle, wherein the first inphase data and the second inphase data are both output from the first sampler and the first inphase data is output earlier than the second inphase data by the certain symbol times, and wherein the first quadrature-phase data and the second quadrature-phase data are both output from the second sampler and the first quadrature-phase data is output earlier than the second quadrature-phase data by the certain symbol times, and
a sine component calculating unit for alternatively calculating and outputting, as second detection data, the first inphase data multiplied by the second quadrature-phase data and the first quadrature-phase data multiplied by the second inphase data at intervals of the sampling cycle;

a first post-detection filter for generating a first component by performing digital signal processing on the first detection data, wherein the first post-detection filter includes a linear interpolation filter and an integral filter;

a second post-detection filter for generating a second component by performing digital signal processing on the second detection data, wherein the second post-detection filter includes a linear interpolation filter and an integral filter, wherein the first component and the second component make up the demodulated baseband signal.

* * * * *